United States Patent [19]

Takada

[11] 4,230,343
[45] Oct. 28, 1980

[54] PASSIVE VEHICLE PASSENGER RESTRAINT BELT SYSTEM

[76] Inventor: Juichiro Takada, 3-12-1, Shinmachi, Setagayaku, Tokyo, Japan

[21] Appl. No.: 6,336

[22] Filed: Jan. 25, 1979

[30] Foreign Application Priority Data

Mar. 9, 1978 [JP] Japan ............................ 53-029074

[51] Int. Cl.³ .......................................... B60R 21/10
[52] U.S. Cl. ................................................. 280/803
[58] Field of Search ............... 280/803, 804, 802, 807; 297/469, 474

[56] References Cited

U.S. PATENT DOCUMENTS

| | | | |
|---|---|---|---|
| 3,182,923 | 5/1965 | Botar | 280/807 |
| 3,827,714 | 8/1974 | Lefeuvre | 280/804 |
| 3,831,971 | 8/1974 | Kaneko et al. | 280/802 |
| 3,933,369 | 1/1976 | Kaneko et al. | 280/803 |

FOREIGN PATENT DOCUMENTS 2354243  5/1974  Fed. Rep. of Germany ........... 280/807

Primary Examiner—John A. Pekar
Attorney, Agent, or Firm—Brumbaugh, Graves, Donohue & Raymond

[57] ABSTRACT

A passive vehicle passenger restraint belt system comprises a continuous belt having one end connected to the upper rear corner of a vehicle door and including a shoulder belt portion leading from that end to and passing freely through a control ring and a lap belt portion leading from the control ring to and passing freely through a transfer guide ring and then to an anchor on the lower rear portion of the door. A control belt, which has the control ring at one end, leads from an emergency locking retractor through a guide inboard of and generally below and rearwardly of a passenger position on the seat. A first flexible transfer element having one end secured to the transfer guide ring and the other end wound onto a winding device located on the lower rear portion of the door pulls the transfer guide ring rearwardly and downwardly along the door in response to closing motion of the door. A second flexible transfer element having one end secured to the transfer guide ring and leading from the guide ring generally forwardly and upwardly along the door, around a guide element and then to a driving device moves the guide ring forwardly and upwardly along the door in response to opening motion of the door. In the rearward position of the transfer guide ring, the control belt pulls the restraint belt into the passenger-restraining position. When the transfer guide ring moves forward upon opening of the vehicle door, it transfers the restraint belt to a passenger-releasing position generally parallel and close to the door.

4 Claims, 2 Drawing Figures

PASSIVE VEHICLE PASSENGER RESTRAINT BELT SYSTEM

FIELD OF THE INVENTION

This invention relates to passive vehicle passenger restraint belt systems which automatically effect the restraint and release of a vehicle passenger in response to closing and opening motions of the vehicle door.

Seat belts have long been used to increase the safety of a vehicle passenger by restraining him or her from being thrown from the seat in the event of a collision or upset. Most seat belts in common use must be hooked up and unhooked manually. This inconvenience has discouraged people from using restraint belts. In order to facilitate fitting and removal of the seat belt, various passive belt systems-systems which operate automatically in response to some vehicle function, such as opening and closing of the door have been proposed. Such passive systems will soon be required by law.

The most commonly proposed systems include a driving mechanism which operates in response to the opening and closing motions of the door and a belt transfer mechanism driven by the driving mechanism for transferring the belt from the restraining position to the releasing position. When the door is opened, the device transfers the belt and automatically releases the occupant. The belt transfer mechanisms that have been used most commonly are those employing an endless belt and those employing a guide sliding inside a guide rail and driven by a constrained wire. These mechanisms are often of complicated and costly construction and are subject to design restrictions such as the shape and location of the guide rail.

SUMMARY OF THE INVENTION

There is provided, in accordance with the present invention, a passive vehicle passenger restraint belt system which operates in response to opening and closing motions of the door and represents a highly practical solution to facilitating transfer of a shoulder and lap belt between passenger-restraining and passenger-releasing positions in that it consists of a relatively simple belt arrangement and belt transfer mechanism.

More particularly, the invention comprises a continuous restrant belt having one end connected to the upper rear portion of the vehicle door and the other end connected to the lower rear portion of the door. A shoulder belt portion of the belt leads from the upper corner of the door to and freely through a control ring, and a lap portion of the belt leads from the control ring to and freely through a transfer guide ring from which it passes to an anchor on the lower rear portion of the door. The control ring is connected to one end of a control belt, the other end of which leads to a location inboard of and generally below and rearwardly of a passenger position on the seat and into an emergency locking retractor. A first flexible transfer element is connected at one end to the transfer guide ring and at the other end is wound onto a winding device located on the lower rear portion of the door. A second flexible transfer element is connected at one end to the transfer guide ring and leads from the guide ring generally forwardly and upwardly along the door, around the guide element and thence to a driving device which pulls the guide ring forwardly and upwardly along the door in response to opening motion of the door and releases the transfer guide in response to closing motion of the door so that it can move rearwardly and downwardly along the door upon rewinding of the first transfer element by the winding device.

When the door is opened, the driving device automatically pulls the guide ring upwardly and forwardly along the door, thereby pulling the shoulder and lap belt portion of the restraint belt generally up against the inner surface of the door and at the same time withdrawing the control belt from the locking retractor. When the door is reclosed, the transfer guide ring is pulled by the first transfer device rearwardly and downwardly along the door to a position near the lower restraint belt anchor. Meanwhile the control belt rewinds onto the retractor and pulls the lap and shoulder belt portions of the restraint belt across the vehicle seat into passenger-restraining positions.

For a better understanding of the invention, reference may be made to the following description of an exemplary embodiment, taken in conjunction with the figures of the accompanying drawings.

DESCRIPTION OF EXEMPLARY EMBODIMENT

Figure 1:
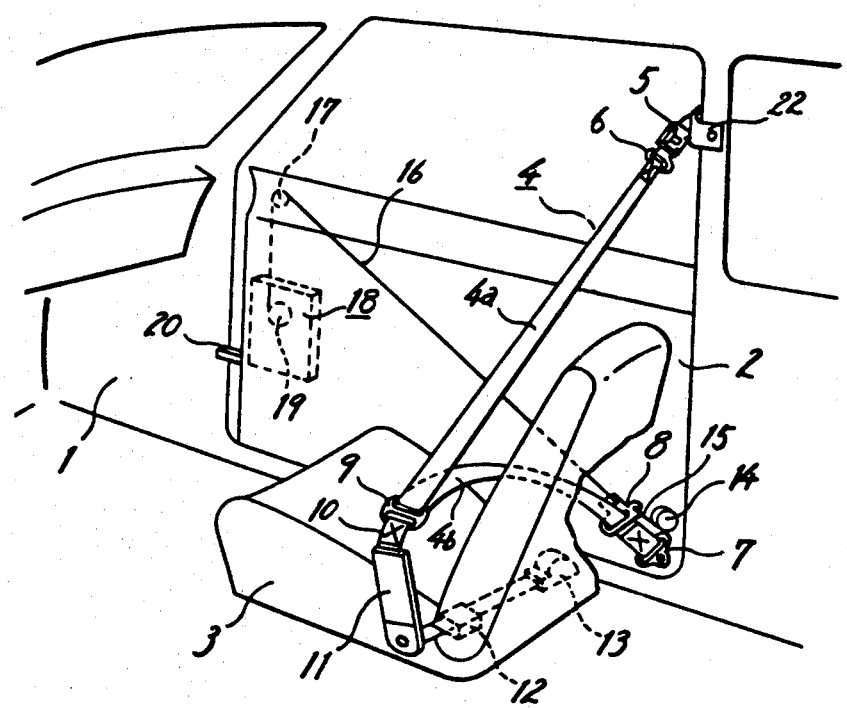
FIG. 1 is a pictorial view of the embodiment in generally schematic form, the system being shown in the occupant-restraining position.
Figure 2:
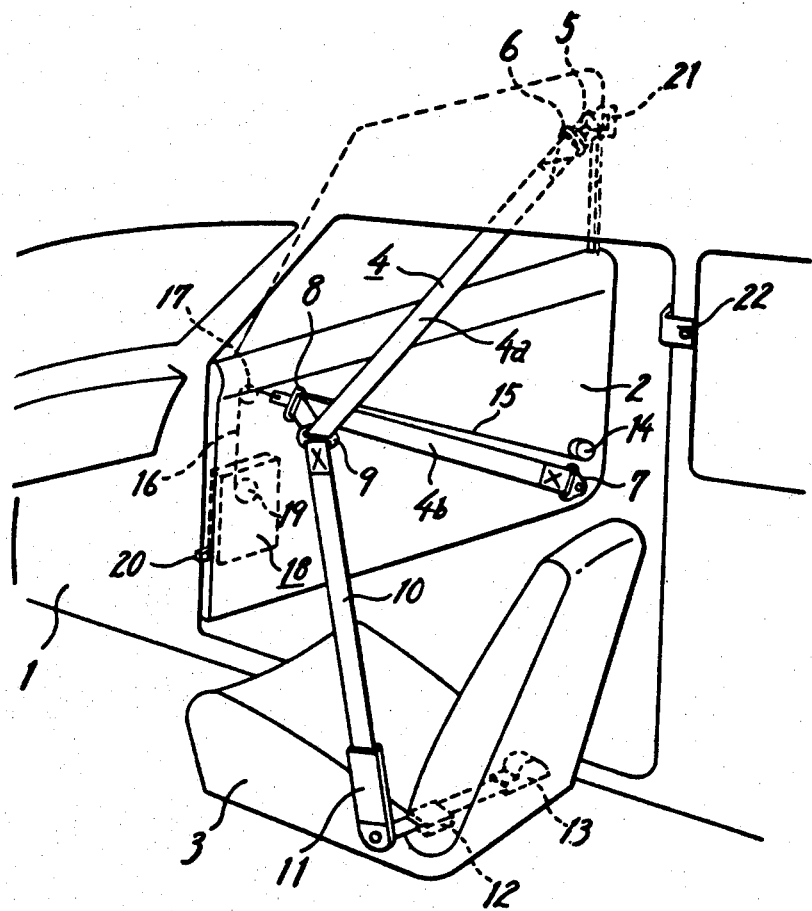
FIG. 2 is a pictorial, schematic view of the embodiment showing it in the passenger-releasing position.

The embodiment is designed for use in conjunction with the front seat 3 of a vehicle 1 and utilizes the opening and closing motions of the vehicle door 2 for transferring the belt between a restraining position (FIG. 1) and a releasing position (FIG. 2). The system comprises a continuous restraint belt 4 which includes a shoulder belt portion 4a and a lap belt portion 4b. The upper end of the shoulder belt portion 4a is fastened by means of a tongue 6 to a buckle 5 which is secured to the upper rear portion of the door. The buckle 5 permits the restraint belt to be released in an emergency situation while the belt system is in the passenger-restraining position. Otherwise, it is intended that the buckle remain attached to the tongue. Such an emergency might occur, for example, in the event that the door has been damaged and cannot be opened and thereby transfer the belt to a releasing position. The shoulder belt portion 4a leads from the tongue 6 to and freely through a control ring 9, from which point on it turns into the lap belt portion 4b. The lap portion 4b leads from the control ring 9 to and freely through a transfer guide ring 8 and thence to an anchor 7 fastened to the lower rear portion of the door 2.

The control ring 9 is fastened to one end of a control belt 10. The control belt 10 leads from the control ring 9 through a belt guide 11 located inboard of and generally rearwardly of and below the passenger position on the vehicle seat 3 and passes from the guide 11 through a belt clamp mechanism 12 to an emergency locking retractor 13.

The restraint belt 4 is transferred between the restraining and releasing positions by movement of the transfer guide ring 8 generally diagonally along the inner door panel from a position near the anchor 7 to a position close to the upper front corner of the inner door panel. Such movement of the transfer guide ring 8 is accomplished, first, by a flexible control element 15, one end of which is fastened to the transfer guide ring 8 and the other end of which is wound onto a winding device 14 located adjacent the lower rear corner of the door and, second, by a flexible control element 16, one end of which is fastened to the transfer guide ring 8 and the other end of which leads around a guide element 17 onto a pulley 19 associated with a mechanical motion amplifier 18. The flexible transfer elements 15 and 16 may be any suitable cords, narrow belts, wires or the like. The winding device 14 may be any relatively simple spring operated reel which freely pays out and rewinds the flexible element.

Although various devices for winding up and paying out the transfer element 16 may be used, it is preferred to employ a mechanical motion amplifier of the type described as shown in U.S. patent application Ser. No. 950,020 filed Oct. 20, 1978, which is owned by the assignee of the present invention. The mechanical motion amplifier operates in response to opening and closing motions of the door and transmits and amplifies the opening and closing motions of the door by means of a linkage 20, one end of which is connected to the vehicle body adjacent the front, hinged end of the door 2 and the other end of which drives a gear train which amplifies the motion of the door relative to the vehicle body. It will be readily apparent to those skilled in the art, however, that various drive devices may be employed with the invention to wind up and pay out the flexible control element 16 in response to opening and closing motions of the vehicle door.

When the vehicle door is closed, the restraint belt system is maintained in the passenger-restraint position shown in FIG. 1. In that configuration the amplifier mechanism 18 has paid out the flexible element 16, thus allowing the spring winding device 14 to wind up the flexible transfer element 15 and thereby pull the transfer guide ring 8 into a position near the lower rear corner of the door adjacent the lower anchor 7. Meanwhile the emergency locking retractor 13 pulls the control belt 9 in so that the control ring 9 is held at an inboard position generally inwardly of behind and below the lap of a passenger occupying the seat 3. In that position, the shoulder belt portion 4a is pulled downwardly and inwardly generally across the body of the passenger occupying the seat while the lap belt portion 4b is, similarly, pulled across the lap of the passenger. When the door is closed, a strong hook 21 near the upper rear corner of the door mates with a bracket 22 on the pillar behind the door.

The above-described embodiment of the invention is susceptible of numerous variations and modifications. For example, rather than locating the control belt retractor 13 under and on generally the door side of the passenger seat, it can be located in a more inboard position. Instead of providing an anchor 7 at the lower end of the restraint belt 4, an emergency locking retractor can be provided at that location. The latter modification should improve the fit of the seat belt to passengers of various physiques. The aforementioned and other variations and modifications are intended to be included within the scope of the invention as defined in the appended claims.

Thus there is provided, in accordance with the present invention, a passive vehicle passenger restraint belt system which operates with relatively small net forces because of the free movement of the transfer guide by means of flexible transfer elements. The transfer elements 15 and 16 are moved smoothly and easily by virtue of being wound onto and unwound from reels. Meanwhile, the motion of the guide is stable because it is held in position by the tension in the transfer elements for movement along a predictable path.

I claim:

1. A passive vehicle passenger restraint belt system comprising a continuous belt having one end connected to the upper rear corner of a vehicle door and including a shoulder belt portion leading from that end to and passing freely through a control ring and a lap belt portion leading from the control ring to and passing freely through a transfer guide ring and thence to an anchor on the lower rear portion of the door; a control belt having one end connected to the control ring and leading from the control ring to a location inboard of and generally below and rearwardly of a passenger position on the seat and thence into an emergency locking retractor; a first flexible transfer element having one end secured to the transfer guide ring and the other end wound onto a winding device located on the lower rear portion of the door; and a second flexible transfer element having one end secured to the transfer guide ring and leading from the guide ring generally forwardly and upwardly along the door, around a guide element and thence to driving means for pulling the guide ring forwardly and upwardly along the door in response to opening motion of the door and for releasing the transfer guide ring for movement rearwardly and downwardly along the door by rewinding of the first transfer element on the winding device in response to closing motion of the door.

2. The passenger restraint belt system of claim 1, wherein the transfer guide ring is freely slidable on the lap belt portion of the continuous belt, is guided for movement along the door by said first and second flexible transfer elements, and is free of further guiding attachment to the door.

3. The passenger restraint belt system of claim 2, wherein the first flexible transfer element is a first wire having the one end thereof secured to the transfer guide ring, said winding device comprises a wire winding mechanism secured proximate the anchor on the lower rear portion of the door and has the other end of the first wire wound therein, the second flexible transfer element comprises a second wire having the one end secured to the transfer guide ring, said driving means for pulling comprising a wire accommodating pulley having the other end of the second wire wound thereon and a mechanical motion amplifier mounted in the door for winding the second wire on the pulley when the door is opened.

4. The passenger restraint belt system of claim 2 or 3, the shoulder belt portion having a releasable emergency buckle thereon immovably located proximate the one end of the shoulder belt portion connected to the upper rear corner of the vehicle door, said shoulder belt portion passing directly from the emergency buckle to the control ring absent any intermediate passage through or connection to any further member, an upstanding elongate sleeve-like guide member located on the inboard side of the seat, an intermediate portion of said control belt between said control ring and said emergency locking retractor passing through said guide member, said control ring being connected only to said control belt and slidably to said continuous belt, and said one end of the second flexible transfer element comprising the only drive connection to the continuous belt for moving the shoulder and the lap belt portions forward upon opening of the door.

* * * * *